United States Patent
Ouyang et al.

(10) Patent No.: US 12,058,774 B2
(45) Date of Patent: Aug. 6, 2024

(54) DATA PROCESSING METHOD, DATA PROCESSING APPARATUS, ELECTRONIC DEVICE AND COMPUTER READABLE STORAGE MEDIUM

(71) Applicant: Asiainfo Technologies (China), Inc., Beijing (CN)

(72) Inventors: Ye Ouyang, Beijing (CN); Zhanwu Li, Beijing (CN); Shoufeng Wang, Beijing (CN)

(73) Assignee: ASIAINFO TECHNOLOGIES (CHINA), INC., Beijing (CN)

( * ) Notice: Subject to any disclaimer, the term of this patent is extended or adjusted under 35 U.S.C. 154(b) by 0 days.

(21) Appl. No.: 18/196,218

(22) Filed: May 11, 2023

(65) Prior Publication Data

US 2023/0284009 A1    Sep. 7, 2023

(30) Foreign Application Priority Data

Dec. 13, 2022  (CN) .......................... 202211595327.9

(51) Int. Cl.
  *G06F 15/16*  (2006.01)
  *H04L 43/026*  (2022.01)
  *H04W 8/18*  (2009.01)

(52) U.S. Cl.
  CPC ............. *H04W 8/18* (2013.01); *H04L 43/026* (2013.01)

(58) Field of Classification Search
  None
  See application file for complete search history.

(56) References Cited

U.S. PATENT DOCUMENTS

2011/0271007 A1* 11/2011 Wang ................ H04L 45/50
                                             713/160
2015/0207677 A1* 7/2015 Choudhury ......... H04L 41/0895
                                             370/254

(Continued)

FOREIGN PATENT DOCUMENTS

CN        111200514 A     5/2020
CN        113259147 A     8/2021

(Continued)

OTHER PUBLICATIONS

Search Report dated Jan. 28, 2023 from the Office Action for Chinese Application No. 202211595327.9 issued Feb. 1, 2023, 2 p. [See p. 1, categorizing the cited references].

(Continued)

*Primary Examiner* — Phuoc H Nguyen
(74) *Attorney, Agent, or Firm* — Ladas & Parry, LLP

(57) ABSTRACT

Embodiments of the present application provide a data processing method, a data processing apparatus, an electronic device and a storage medium, and relate to the technical field of mobile communication network. The method includes: acquiring first data from a network element interface, the first data being business-related data; acquiring first target data by processing the first data; and transmitting the first target data to a second functional entity, for the second functional entity to generate a control instruction based on the first target data and second target data and to send the control instruction to the network element related to the control instruction. In embodiments of the present application, the collection and processing tasks of the business data are undertaken by the first functional entity, and the network element is freed from the collection and processing of the business data contributing a larger proportion of data.

15 Claims, 8 Drawing Sheets

(56) References Cited

U.S. PATENT DOCUMENTS

| | | | |
|---|---|---|---|
| 2016/0007316 A1* | 1/2016 | Vaidya | H04W 64/003 |
| | | | 370/312 |
| 2018/0343567 A1* | 11/2018 | Ashrafi | H04L 43/20 |
| 2019/0165890 A1* | 5/2019 | Pietraski | H04L 5/0094 |
| 2022/0247678 A1* | 8/2022 | Atwal | H04L 45/645 |

FOREIGN PATENT DOCUMENTS

| | | |
|---|---|---|
| EP | 4175235 A1 | 5/2023 |
| WO | 2022123526 A1 | 6/2022 |

OTHER PUBLICATIONS

Tao, L. et al., "Discussion on Data Collection and Sharing Scheme of Telecom Operators," Monthly Focus, Dec. 2015, pp. 12-17. [English Translation of Abstract only].

* cited by examiner

DATA PROCESSING METHOD, DATA PROCESSING APPARATUS, ELECTRONIC DEVICE AND COMPUTER READABLE STORAGE MEDIUM

CROSS-REFERENCE TO RELATED APPLICATIONS

This application claims priority to Chinese Patent Application No. 2022115953279, filed on Dec. 13, 2022, the content of which is hereby incorporated by reference in its entirety.

TECHNICAL FIELD

The present application relates to the technical field of mobile communication network, and in particular, the present application relates to a data processing method, a data processing apparatus, an electronic device and a storage medium.

BACKGROUND

With the continuous development of mobile communication technology, intelligence and servitization will become the direction of future network development. However, high-quality intelligence needs to be supported by a large amount of data. In the existing network intelligence system, mainly, a data collection module actively subscribes to a service-oriented network functional entity for related data, and thus processing and reporting services on large amount of data are concentrated in the service-oriented network functional entity, which affects the processing capability of the service-oriented network functional entity for core businesses and reduces the stability and security of the core business function.

SUMMARY

Embodiments of the present application provide a data processing method, a data processing apparatus, an electronic device and a storage medium, which can solve the problem that data collection reduces a processing capability of a service-oriented network functional entity for core businesses in the prior art.

The technical solutions are as follows:

According to a first aspect of the embodiments of the present application, there is provided a data processing method, and the method includes:
  acquiring first data from a network element interface, the first data being business-related data;
  acquiring first target data by processing the first data; and
  transmitting the first target data to a second functional entity, for the second functional entity to generate a control instruction based on the first target data and second target data and to send the control instruction to the network element related to the control instruction;
  wherein the second target data is obtained by the second functional entity by processing second data; the second data is acquired by the second functional entity from the network element; and the second data is data related to the network element.

Optionally, the acquiring first data from a network element interface includes:
  acquiring, from the network element interface, the first data via a virtual deep packet inspection technique.

Optionally, acquiring first target data by processing the first data includes:
  processing the first data to obtain first candidate data;
  receiving a first data subscription request transmitted from the second functional entity; and
  obtaining the first target data by filtering the first candidate data according to the first data subscription request.

Optionally, the method further includes:
  receiving an openness requirement indication;
  filtering the first candidate data based on the openness requirement indication to obtain first open data; and
  transmitting the first open data to a data demander.

According to a second aspect of the embodiments of the present application, there is provided a data processing method, and the method includes:
  acquiring second data from a network element, the second data being data related to the network element;
  acquiring second target data by processing the second data; and
  receiving first target data transmitted from a first functional entity;
  wherein the first target data is obtained by the first functional entity by performing a process on the basis of first data, the first data is acquired by the first functional entity from a network element interface, and the first data is business-related data;
  generating a control instruction based on the first target data and the second target data; and
  sending the control instruction to the network element related to the control instruction.

Optionally, the acquiring second data from a network element includes:
  receiving a service requirement indication; determining, based on the service requirement indication, an associated network element related to the service requirement indication;
  transmitting a second data subscription request to the associated network element; and
  receiving the second data related to the second data subscription request that is transmitted from the associated network element.

Optionally, the receiving first target data transmitted from a first functional entity includes:
  determining a first data subscription request according to the service requirement indication;
  transmitting the first data subscription request to the first functional entity, for the first functional entity to determine the first target data based on the first data subscription request; and
  receiving the first target data transmitted from the first functional entity.

Optionally, the generating a control instruction based on the first target data and the second target data includes:
  processing the first target data and the second target data via a preset algorithm according to the service requirement indication, to obtain the control instruction.

According to a third aspect of the embodiments of the present application, there is provided a data processing method, and the method includes:
  acquiring, by a first functional entity, first data from a network element interface, and acquiring first target data by processing the first data, wherein the first data is business-related data;
  acquiring, by a second functional entity, second data from a network element, and acquiring second target data by processing the second data, wherein the second data is data related to the network element;

transmitting, by the first functional entity, the first target data to the second functional entity;

receiving, by the second functional entity, the first target data;

generating, by the second functional entity, a control instruction, based on the first target data and the second target data; and sending, by the second functional entity, the control instruction to the network element related to the control instruction.

According to a fourth aspect of the embodiments of the present application, there is provided a data processing apparatus, and the apparatus includes:

a first data acquiring module configured to acquire first data from a network element interface, the first data being business-related data;

a first data processing module configured to acquire first target data by processing the first data; and a first target data transmitting module configured to transmit the first target data to a second functional entity, for the second functional entity to generate a control instruction based on the first target data and second target data and to send the control instruction to the network element related to the control instruction;

wherein the second target data is obtained by the second functional entity by processing second data; the second data is acquired by the second functional entity from the network element; and the second data is data related to the network element.

According to a fifth aspect of the embodiments of the present application, there is provided a data processing apparatus, and the apparatus includes:

a second data acquiring module configured to acquire second data from a network element, the second data being data related to the network element;

a second data processing module configured to acquire second target data by processing the second data;

a first target data receiving module configured to receive first target data transmitted from a first functional entity;

wherein the first target data is obtained by the first functional entity by performing a process on the basis of first data, the first data is acquired by the first functional entity from a network element interface, and the first data is business-related data;

a control instruction generating module configured to generate a control instruction based on the first target data and the second target data, and a control instruction sending module configured to send the control instruction to the network element related to the control instructions.

According to a sixth aspect of the embodiments of the present application, there is provided an electronic device including a memory, a processor and a computer program stored on the memory and executable on the processor, wherein the computer program, when executed by the processor, implement the steps of any one of the data processing methods described above.

According to a seventh aspect of the embodiments of the present application, there is provided a computer readable storage medium having a computer program stored thereon, wherein the computer program, when executed by the processor, implements the steps of any one of the data processing methods described above.

The beneficial effects brought by the technical solutions provided by the embodiments of the present application are as follows.

The first data, i.e., business data, is acquired by the first functional entity from the network element interface, and the second data, i.e., network element data, is acquired by the second functional entity from the network element. Two different collection approaches (from the network element and from the network element interface) are implemented for data collection, and thus the business data and the network element data are collected separately.

The business data is collected and processed by the first functional entity, and the processed first target data is transmitted from the first functional entity directly to the second functional entity. Compared with the prior art where all tasks of data collection and processing are concentrated in the network element, in the methods provided by embodiments of the present application, the collection and processing tasks of the business data are undertaken by the first functional entity, and the network element is freed from the collection and processing of the business data contributing to a larger proportion of data. Therefore, the collection and processing of the business data will not affect the processing capability of the network element for the core businesses, and thus the network element can focus on processing the core businesses, further improving the stability and security of the core business function.

Moreover, since the business data is collected by the first functional entity from the network element interface, the business data is collected without interaction with the network element, enabling data collection of the business data with no interference to the network.

Further, compared with collecting data from the network element, when data is collected from the network element interface, there is no need to wait for data transmission to complete, and data collection can be done during the data transmission procedure, resulting in less latency and more efficient data collection.

BRIEF DESCRIPTION OF DRAWINGS

In order to explain technical solutions in embodiments of the present application more clearly, accompanying drawings used in the description of the embodiments of the present application will be briefly described below.

DETAILED DESCRIPTION

Figure 1:
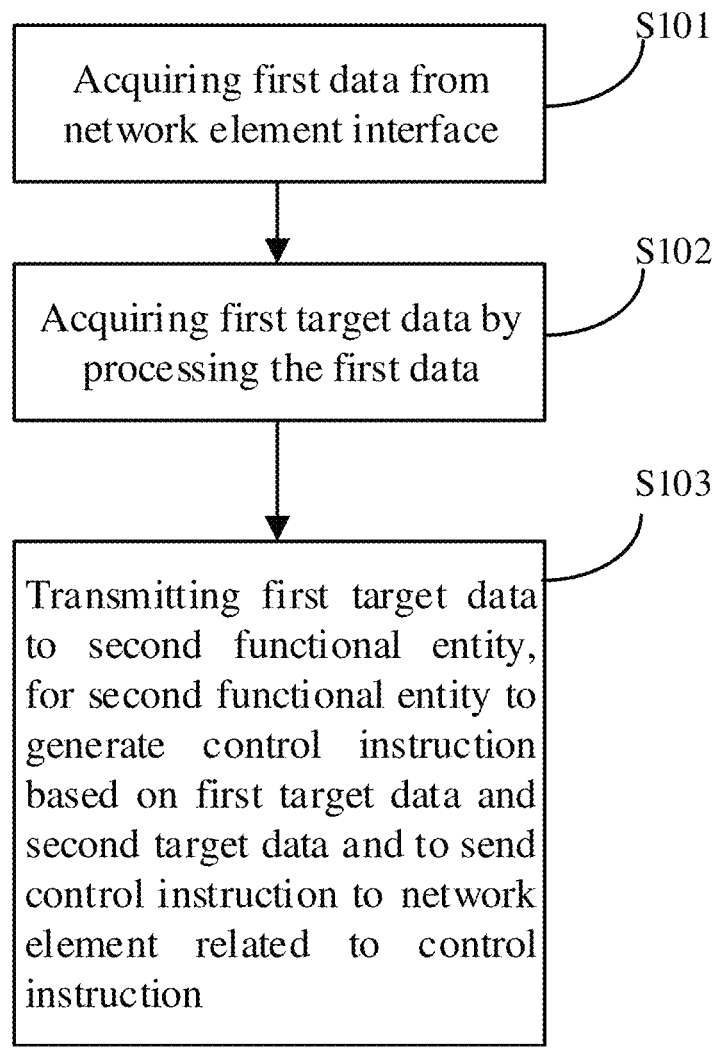
FIG. 1 is a schematic flowchart of a data processing method according to an embodiment of the present application.

Embodiments of the present application will be described below with reference to accompanying drawings in the present application. It should be understood that the embodiments set forth below in combination with the accompanying drawings are exemplary descriptions for explaining technical solutions of the embodiments of the present application, and do not limit the technical solutions of the embodiments of the present application.

It should be understood by those skilled in the art that, as used herein, the singular form "a", "an" or "the" may be intended to include plural forms as well, unless otherwise stated. It should be further understood that the term "comprise/comprising" or "include/including" used in the embodiments of the present application refers that the corresponding features may be implemented as the presented features, information, data, steps, operations, elements and/or components, but does not exclude that they are implemented as other features, information, data, steps, operations, elements, components and/or combinations thereof supported in the art. It should be understood that, when an element is referred to be "connected to" or "coupled to" to another element, this element may be directly connected to or coupled to the another element, or this element may be connected to the another element through an intermediate element. Further, "connection" or "coupling" used herein may include wireless connection or wireless coupling. The term "and/or" used herein indicates at least one of the items defined by the term, for example "A and/or B" may be implemented as "A", or as "B", or as "A and B".

In order to make the objectives, technical solutions and advantages of the present application clearer, the embodiments of the present application will be further described in detail below in combination with the accompanying drawings.

With the continuous development of mobile communication technology, intelligence and servitization will become the direction of future network development. However, high-quality intelligence needs to be supported by a large amount of data. In the existing network intelligence system, mainly, a data collection module actively subscribes to a service-oriented network functional entity for relevant data. After receiving a subscription request, the service-oriented network functional entity needs to perform data collection and data processing according to the subscription request and then report the processed data to the corresponding data collection module.

In the data collection methods in the prior art, the processing and reporting services on large amount of data are concentrated in the service-oriented network functional entity, which affects the processing capability of the service-oriented network functional entity for core businesses, reduces the stability and security of the core business function and does not meet the goal of minimalist network.

The present application provides a data processing method, a data processing apparatus, an electronic device and a storage medium with the intention to solve the above-described technical problems in the prior art.

The technical solutions of the embodiments of the present application and the technical effects resulted from the technical solutions of the present application are illustrated below by describing several exemplary implementations. It is to be noted that the following implementations may refer to or be learned from one another or be combined with one another, and the same terms, similar features and similar implementation steps in different implementations will not be repeated.

FIG. 1 is a schematic flowchart of a data processing method according to an embodiment of the present application. As shown in FIG. 1, an example is taken where the method is applied with a first functional entity. The method includes steps S101-S103.

At step S101, first data is acquired from a network element interface, the first data being business-related data.

Specifically, the functional entity may be a software entity for performing a certain function. In embodiments of the present application, the first functional entity may be configured to acquire the first data from the network element interface, acquire first target data by processing the first data, and transmit the first target data to a second functional entity.

A mobile communication network may be consisted of multiple network elements in communication with each other via a network element interface. An network element is an element in the network and may be a hardware device or a software function, which is not limited in the embodiments of the present application. The mobile communication network may be a current 5th generation mobile communication technology (5G) network or a future network, i.e., a new-generation network, e.g., a beyond 5G mobile communication technology (B5G) network or a 6th generation mobile communication technology (6G) network.

The first functional entity may acquire the first data from the network element interface in the mobile communication network. The first data may be business-related data transmitted over the interface between the network elements constituting the network. The first data may include control plane data and user plane data. The control plane data may include a message content of a signaling, and the user plane data may include an actual business content.

At step S102, first target data is acquired by processing the first data.

Specifically, after obtaining the first data by collection, the first functional entity may process the first data (e.g., perform processes such as classifying, cleaning, filtering and statistical analysis on the first data), and acquire the first target data on the basis of the processed first data. All of the processed first data may be taken as the first target data, or with interaction between the first functional entity and the second functional entity, data required by the second functional entity may be taken as the first target data, which is not specifically limited in the embodiments of the present application.

At step S103, the first target data is transmitted to the second functional entity, for the second functional entity to generate a control instruction on the basis of the first target data and second target data and to send the control instruction to a network element related to the control instruction.

The second target data is obtained by processing second data by the second functional entity; the second data is acquired by the second functional entity from the network element; and the second data is data related to the network element.

Specifically, the second functional entity may acquire the second data from the network element. The second data may be data related to the network element, i.e., network element data. The second data may include configuration information, operation status information and resource information of the service-oriented network element (also may be referred to as network functional entity).

Subsequently, the second target data is obtained by the second functional entity by processing the second data.

The first target data, after generated by the first functional entity, is transmitted to the second functional entity. The first target data may be regularly transmitted from the first functional entity to the second functional entity on a preset interval basis, or the step for transmitting the first target data may be triggered by interaction with the second functional entity, which is not limited in the embodiments of the present application.

The second functional entity receives the first target data transmitted from the first functional entity, combines the first target data and the second target data, and generates a control instruction by processing the combined first target data and second target data. Intelligent control of the network can be achieved via the control instruction.

In embodiments of the present application, the first data, i.e., business data, is acquired by the first functional entity from the network element interface, and the second data, i.e., network element data, is acquired by the second functional entity from the network element. Two different collection approaches (from the network element and from the network element interface) are implemented for data collection, and thus the business data and the network element data are collected separately.

The business data is collected and processed by the first functional entity, and the processed first target data is transmitted from the first functional entity directly to the second functional entity. Compared with the prior art where all tasks of data collection and processing are concentrated in the network element, in the methods provided by embodiments of the present application, the collection and processing tasks of the business data are undertaken by the first functional entity, and the network element is freed from the collection and processing of the business data contributing to a larger proportion of data. Therefore, the collection and processing of the business data will not affect the processing capability of the network element for the core businesses, and thus the network element can focus on processing the core businesses, further improving the stability and security of the core business function.

Moreover, since the business data is collected by the first functional entity from the network element interface, the business data is collected without interaction with the network element, enabling data collection of the business data with no interference to the network.

Further, compared with collecting data from the network element, when data is collected from the network element interface, there is no need to wait for data transmission to complete, and data collection can be done during the data transmission procedure, resulting in less latency and more efficient data collection.

Figure 2:
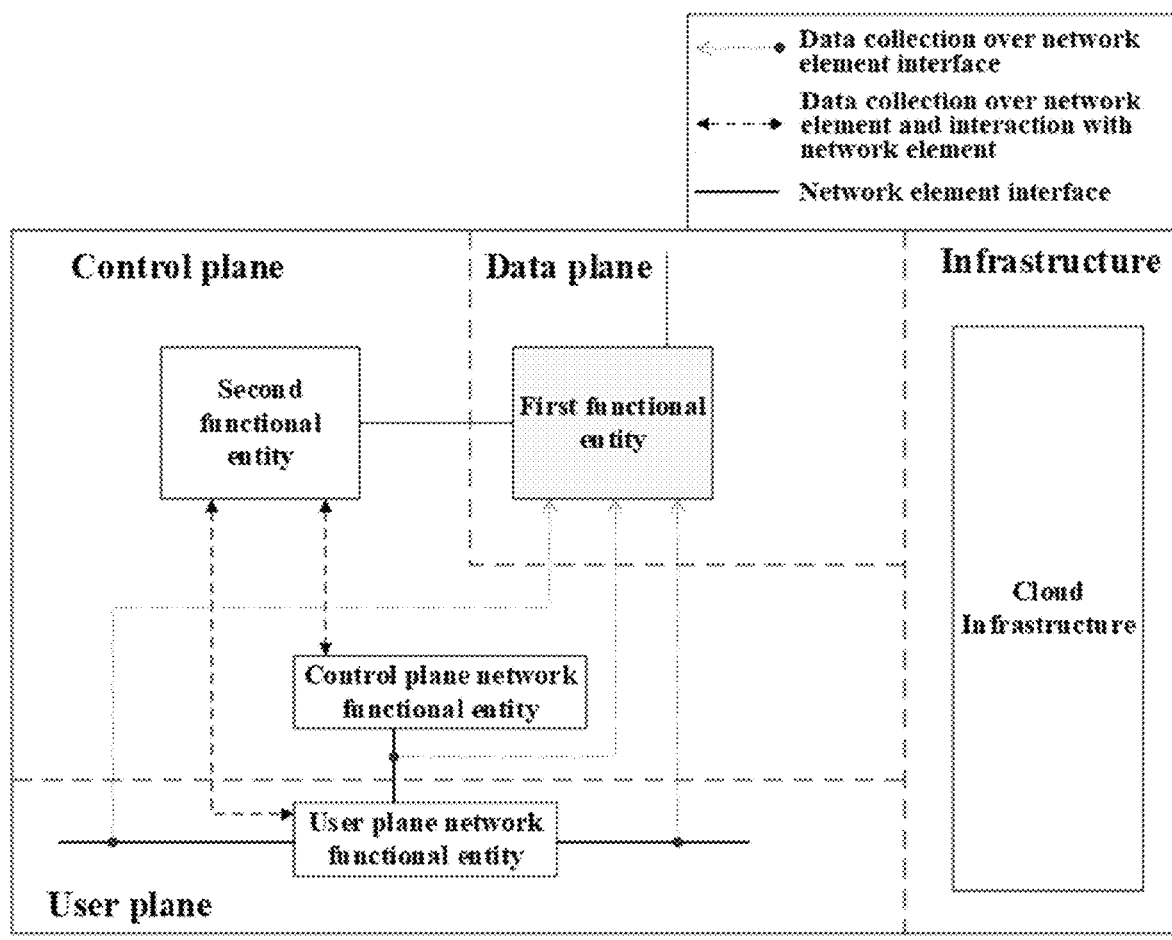
FIG. 2 is a schematic diagram of a functional architecture according to an embodiment of the present application.

As an optional embodiment, FIG. 2 is a schematic diagram of a functional architecture according to an embodiment of the present application. As shown in FIG. 2, the functional architecture includes four logical planes including a control plane, a user plane, a data plane, and infrastructure. The control plane is used for transmission of a control signaling, the user plane is used for transmission of user data, and the infrastructure may include a series of hardwares and softwares for implementing intelligence and servitization. The infrastructure may be cloud infrastructure, that is, the infrastructure is built based on the cloud technology, e.g., cloud computing and cloud storage.

Cloud computing is a computing mode in which the computing tasks are distributed over a resource pool constituted of a large number of computers, so that various application systems can acquire computing power, storage space and information service as needed. The network providing the resources is referred to as 'cloud'. From the users' perspective, the resources in the 'cloud' can be expanded without limitation, acquired at any time, used as needed, expanded at any time and paid per utilization. Cloud storage is a new concept extended and developed from the concept of cloud computing. Cloud storage may be a storage system in which a large number of different types of storage devices (the storage devices are also called storage nodes) in a network work together through application softwares or application interfaces to provide data storage and business access functions to the outside.

In FIG. 2, various logical planes are separated by dashed lines. The first functional entity may be located in the data plane, and the second functional entity may be located in the control plane. A control plane network functional entity (equivalent to the network element) and a user plane network functional entity (equivalent to the network element) are also included in FIG. 2. The solid lines for connection between various functional entities in FIG. 2 may represent the network element interfaces. A dotted line with a single arrow represents a transmission path for the first functional entity to collect the first data from the network element interface. A dashed line with two arrows represents a transmission path for the second functional entity to collect the second data from the network element and the interaction between the second functional entity and the network element.

It should be noted that network functional entity and network element are different names for a same object according to different communication protocols, and network functional entity can be understood as the same concept as network element.

In the functional architecture according to embodiments of the present application, a data plane dedicated to process data is provided based on the control plane and the user plane. The data plane can be construed as a logic plane for data processing. The development of the network intelligence can result in increase in amount of data. By providing the data plane, the tasks of data processing are all concentrated in the data plane, and thus not only the functional architecture is made clearer, but also a more direct, more comprehensive, and more unified data source is provided for network intelligence, providing a greater operational space for the future evolution of the functional architecture.

Further, the data plane may also provide a function of data openness, so that an external data demander can acquire the required data through interaction with the functional entities in the data plane, which facilitates the promotion of the development of network intelligence ecology.

As an optional embodiment, the acquiring first data from a network element interface in step S101 includes:

acquiring, from the network element interface, the first data via a virtual deep packet inspection technique.

Specifically, the first functional entity may have a virtual deep packet inspection (VDPI) function. The first functional entity may collect the first data from the network element interface through a virtual port mirroring manner via the virtual deep packet inspection technique.

As an optional embodiment, the acquiring the first target data by processing the first data in step S102 includes:

processing the first data to obtain first candidate data;
receiving a first data subscription request transmitted from the second functional entity; and
obtaining the first target data by filtering the first candidate data according to the first data subscription request.

Specifically, after acquiring the first data, the first functional entity may perform processes such as classifying, cleaning, filtering and statistical analysis on the first data, and take the processed data as the first candidate data. The second functional entity may transmit a first data subscription request to the first functional entity. The first data subscription request may include data required by the second functional entity. After receiving the first data subscription request, the first functional entity may obtain the first target data meeting the first data subscription request by filtering the first candidate data according to the first data subscription request, and transmit the first target data to the second functional entity.

An example of the first data according to embodiments of the present application is shown in table 1. As shown in table 1, the first data may include control plane data and user plane data. The control plane data and the user plane data may include interface lists which further include interface names and interface data. A symbol '>' represents a level of data, and each of interface data and an interface name in table 1 is next-level data to an interface list.

In the control plane data, the interface list may include a control plane network element interface for collection, the interface name may include a control plane interface name, and the interface data may include a control plane message transmitted over the control plane network element interface. In the user plane data, the interface list may include a user plane interface for collection, the interface name may include a user plane interface name, and the interface data may include business data transmitted over the user plane network element interface.

TABLE 1

| Information classification | Information | Description |
|---|---|---|
| Control Plane Data | Interface List | control plane network element interface for collection |
| | >Interface Name | control plane interface name |
| | >Interface Data | control plane message transmitted over the control plane network element interface |
| User Plane Data | Interface List | user plane network element interface for collection |
| | >Interface Name | user plane interface name |
| | >Interface Data | business data transmitted over the user plane network element interface |

An example of the first candidate data according to embodiments of the present application is shown in table 2. As shown in table 2, the first candidate data obtained by processing may include a user equipment list (UE list) which further includes user equipment level information (UE Level Info) and user equipment business list (UE Business List), and the user equipment business list further includes user equipment business level information (UE Business Level Info).

The user equipment list may include an information list of collected user equipments. For a UE, the user equipment level information may include basic information such as identity of the corresponding UE, information of overall business data transmission rate of the corresponding UE, and flow information of the control plane business. The user equipment business list may include a list of businesses carried out by the corresponding UE. For a business, the user equipment business level information may include basic information of the corresponding business, and transmission rate, latency, jitter, packet loss and retransmission of data of the corresponding business.

TABLE 2

| Information | Description |
|---|---|
| UE List | information list of collected UEs |
| >UE Level Info | basic information such as identity of the corresponding UE, overall business data transmission rate information of the corresponding UE, and flow information of the control plane business |
| >UE Business List | list of businesses carried out by the corresponding UE |
| >>UE Business Level Info | basic information of the corresponding UE, and transmission rate, latency, jitter, packet loss and retransmission of data of the corresponding business |

As an optional embodiment, the method further includes:
receiving an openness requirement indication;
filtering the first candidate data based on the openness requirement indication, to obtain first open data; and
transmitting the first open data to a data demander.

Specifically, the first functional entity may receive the openness requirement indication transmitted from the data demander, wherein the openness requirement indication may include the data required by the data demander; and filtering the first candidate data obtained by data processing according to the openness requirement indication, to obtain the first open data meeting the openness requirement indication; and finally transmit the first open data to the data demander, thereby implementing a function of data openness.

The data demander may be a network element, a system or an application located externally that is trusted, authenticated, and given an authority to data openness.

In embodiments of the present application, when the data demander requires business-related data, for acquiring business data which meets the requirement and is processed, the data demander only needs to interact with the first functional entity, and interaction with service-oriented network elements is not needed. Therefore, no interference with the service-oriented network elements will occur, alleviating the impact on the service-oriented network elements and thus ensuring the stability and security of the core business functions of the service-oriented network elements.

Figure 3:
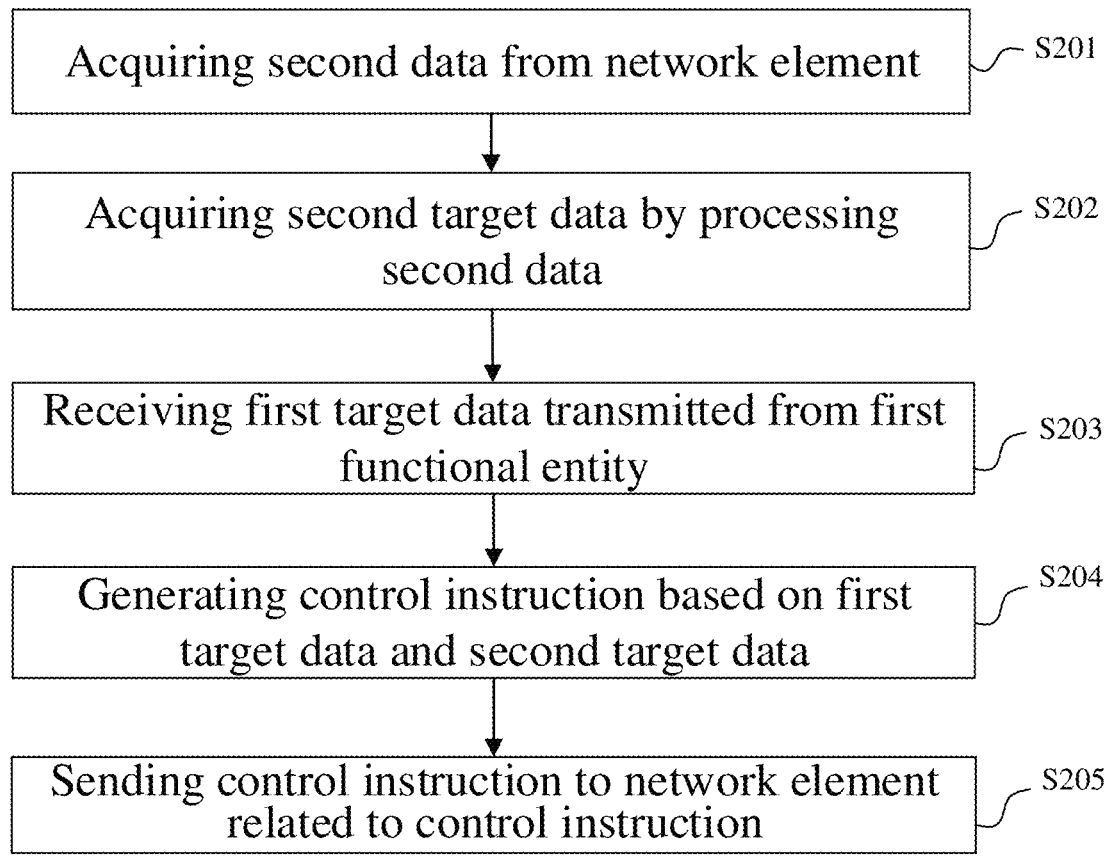
FIG. 3 is a schematic flowchart of a data processing method according to another embodiment of the present application.

FIG. 3 is a schematic flowchart of a data processing method according to an embodiment of the present application. As shown in FIG. 3, an example is taken where the method is applied with a second functional entity, the method includes:
step S201: acquiring second data from a network element, the second data being data related to the network element;
step S202: acquiring second target data by processing the second data;
step S203: receiving first target data transmitted from a first functional entity;
where the first target data is obtained by the first functional entity by processing on the basis of first data, the first data is acquired by the first functional entity from a network element interface, and the first data is business-related data;

step S204: generating a control instruction based on the first target data and the second target data; and step S205: sending the control instruction to the network element related to the control instruction.

Specifically, the second functional entity may acquire the second data from the network element and obtain the second target data by processing the second data.

The first functional entity may acquire the first data from the network element interface, obtain the first target data by processing the first data, and transmit the first target data to the second functional entity.

Upon reception of the first target data transmitted from first functional entity, the second functional entity may generate the control instruction based on the first target data and the second target data, and send the control instruction to the network element related to the control instruction, thereby implementing intelligence control of the network.

An example of the second target data according to embodiments of the present application is shown in table 3. As shown in table 3, the second target data may include network function (NF) list (NF List) which further includes network function basic information (NF Base Info), network function status information (NF Status Info) and network function resource information (NF Resource Info).

The network function basic information may include NF type, NF identify and the like. The network function status information may include NF business status, interface status, network status, energy consumption status and the like. The network function resource information may include resource number, resource occupancy and the like, and may be categorized into general resources and dedicated resources. Different NF types correspond to different resource information contents.

TABLE 3

| Information | Description |
| --- | --- |
| NF List | information list of collected NFs |
| >NF Base Info | basic information of NF, e.g., NF type, NF identify etc. |
| >NF Status Info | status information of NF, e.g., NF business status, interface status, network status, and energy consumption status etc. |
| >NF Resource Info | resource information of NF, e.g., resource number and resource occupancy etc. |

As an optional embodiment, the acquiring second data from a network element in step S201 includes:

receiving a service requirement indication; determining, based on the service requirement indication, an associated network element related to the service requirement indication;

transmitting a second data subscription request to the associated network element; and receiving the second data related to the second data subscription request that is transmitted from the associated network element.

Specifically, the second functional entity may receive the service requirement indication, and determine the network element related to service requirement as the associated network element according to the service requirement indication, i.e., determine network elements of which data needs to be acquired in order to achieve the service requirement.

Subsequently, the second functional entity transmits the second data subscription request to the associated network element, and receives the second data related to the second data subscription request that is returned by the associated network element, that is, acquires the second data actively from the associated network element by means of data subscription.

The service requirement indication may be a requirement about network intelligence control to be satisfied, and correspond to the generated control instruction. For example, the service requirement indication may be a requirement about network optimization, and accordingly the control instruction may be a control instruction for network optimization. The control instruction may include adjustment of a configuration parameter of the network element, allocation of resources in the network, dynamic adjustment of coverage of a base station and the like. The service requirement indication may be set according to the specific application scenarios, which are not limited in embodiments of the present application.

As an optional embodiment, the receiving first target data transmitted from a first functional entity in step S203 includes:

determining a first data subscription request according to the service requirement indication;

transmitting the first data subscription request to the first functional entity, for the first functional entity to determine the first target data based on the first data subscription request; and receiving first target data transmitted from a first functional entity.

Specifically, after determining the service requirement indication, the second functional entity may further determine the first data subscription request, and transmit the first data subscription request to the first functional entity. The first functional entity obtains data meeting the first data subscription request by filtering the processed first data as the first functional entity, and transmits the first target data to the second functional entity.

The second functional entity may receive the first target data transmitted from the first functional entity, for later generation of the control instructions.

As an optional embodiment, the generating control instruction based on the first target data and the second target data in step S204 includes:

processing the first target data and the second target data via a preset algorithm according to the service requirement indication, to obtain the control instruction.

Specifically, after obtaining the first target data and the second target data, the second functional entity may aggregate the first target data and the second target data, perform processes such as data cleaning, data matching and data regulation on the aggregated data to obtain final valid data, and perform an operation on the valid data via the preset algorithm to generate the control instruction, in order to send the control instruction to the network element related to the control instruction later, thereby implementing intelligence control of the network.

The preset algorithm may be an artificial intelligence (AI) algorithm. The artificial intelligence algorithm is a method in which a digital computer or a machine under control of the digital computer is utilized to simulate, extend and expand the human intelligence, perceive the environment, acquire knowledge and obtain best results by using the knowledge.

In the prior art, the acquired business and network element data are analyzed manually, and then adjustments are made to the network element and the network according to the analysis result. In embodiments of the present application, the preset algorithm is set to an artificial intelligence algorithm, so that the second functional entity can have the processing capabilities of artificial intelligence, perform data operations and analysis by utilizing the processing capabilities of the artificial intelligence and generate the control instruction, thereby implementing intelligence control of the network.

Figure 4:
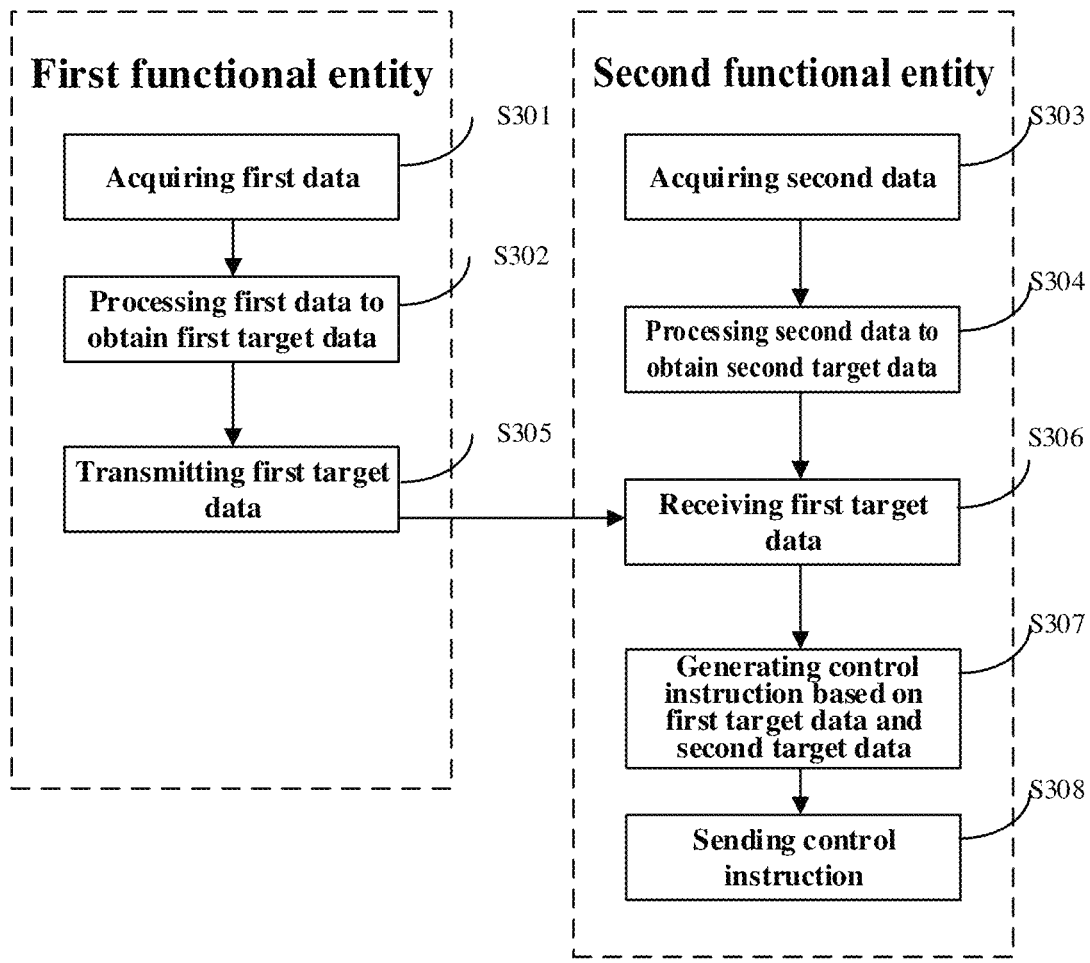
FIG. 4 is a schematic flowchart of a data processing method according to still another embodiment of the present application.

As an optional embodiment, FIG. 4 is a schematic flowchart a data processing method according to an embodiment of the present application. As shown in FIG. 4, the method includes:

step S301: acquiring, by a first functional entity, first data from a network element interface, the first data being business-related data;

step S302: processing, by the first functional entity, the first data, to acquire a first target data;

step S303: acquiring, by a second functional entity, second data from a network element, the second data being data related to the network element;

step S304: processing, by the second functional entity, the second data, to acquire second target data;

step S305: transmitting, by the first functional entity, the first target data to the second functional entity;

step S306: receiving, by the second functional entity, the first target data;

step S307: generating, by the second functional entity, a control instruction, based on the first target data and the second target data; and step S308: sending, by the second functional entity, the control instruction to the network element related to the control instruction.

Figure 5:
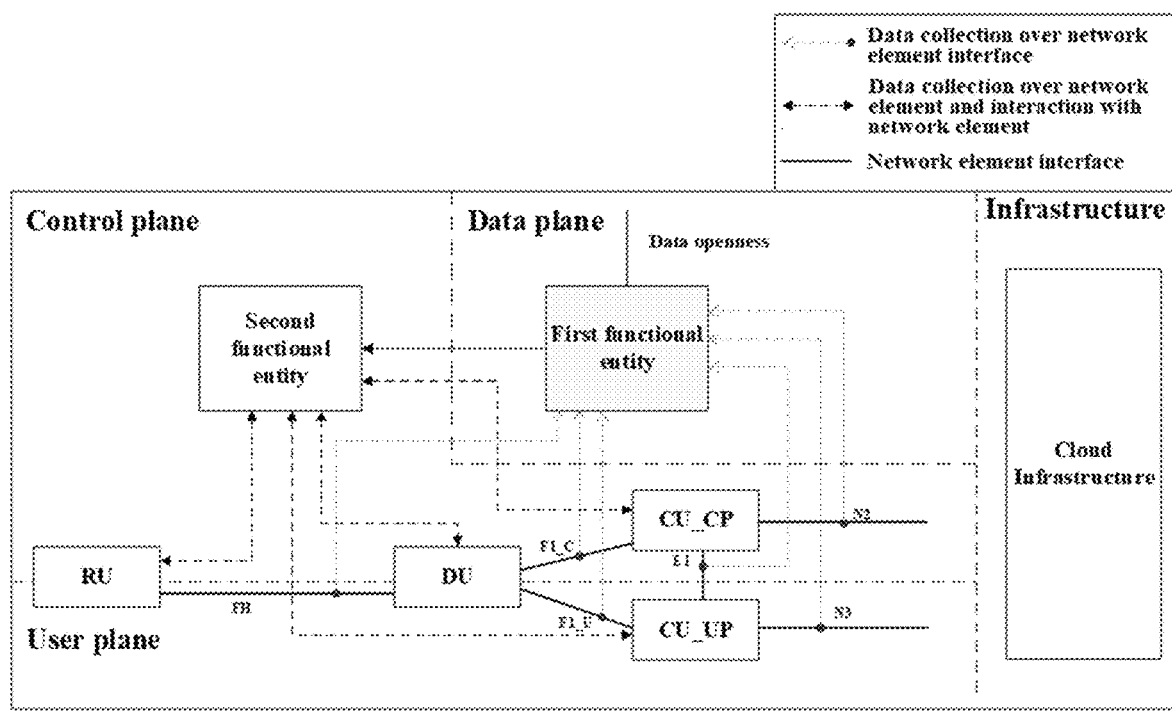
FIG. 5 is a 5G radio access network-based functional architecture diagram according to an embodiment of the present application.

As an optional embodiment, FIG. 5 is a 5G radio access network-based functional architecture diagram according to an embodiment of the present application. As shown in FIG. 5, an embodiment of the present application provides a 5G radio access network-based functional architecture. In the functional architecture, a DU represents a data unit, a CU_CP represents a control unit-control panel, a CU_UP represents a control unit-user panel, and a RU represents a radio unit that is a basic functional component for providing wireless communication businesses. The DU, the CU_CP and the CU_UP are cloud-based service-oriented network functional entities, and the RU is a network functional entity based on dedicated hardware.

The RU and the DU may be located in both the control plane and the user plane.

The first functional entity collects the first data through a virtual port mirroring manner from various interfaces (e.g., N2/N3/FH/F1_C/F1_U) of the network functional entities as described above, generates the first target data by performing processes such as aggregation and statistical analysis on the first data, and provides the first target data to the second functional entity or an external data demander for use.

The second functional entity may acquire the second data from the network functional entities as described above, obtain the second target data by processing the second data, aggregate the first target data and the second target data, perform data processing process such as data cleaning, data cleaning and data regulation, and then generate the network optimization control instruction via the artificial intelligence algorithm and send the instruction to the network functional entities, thereby implementing intelligence control of the network.

Figure 6:
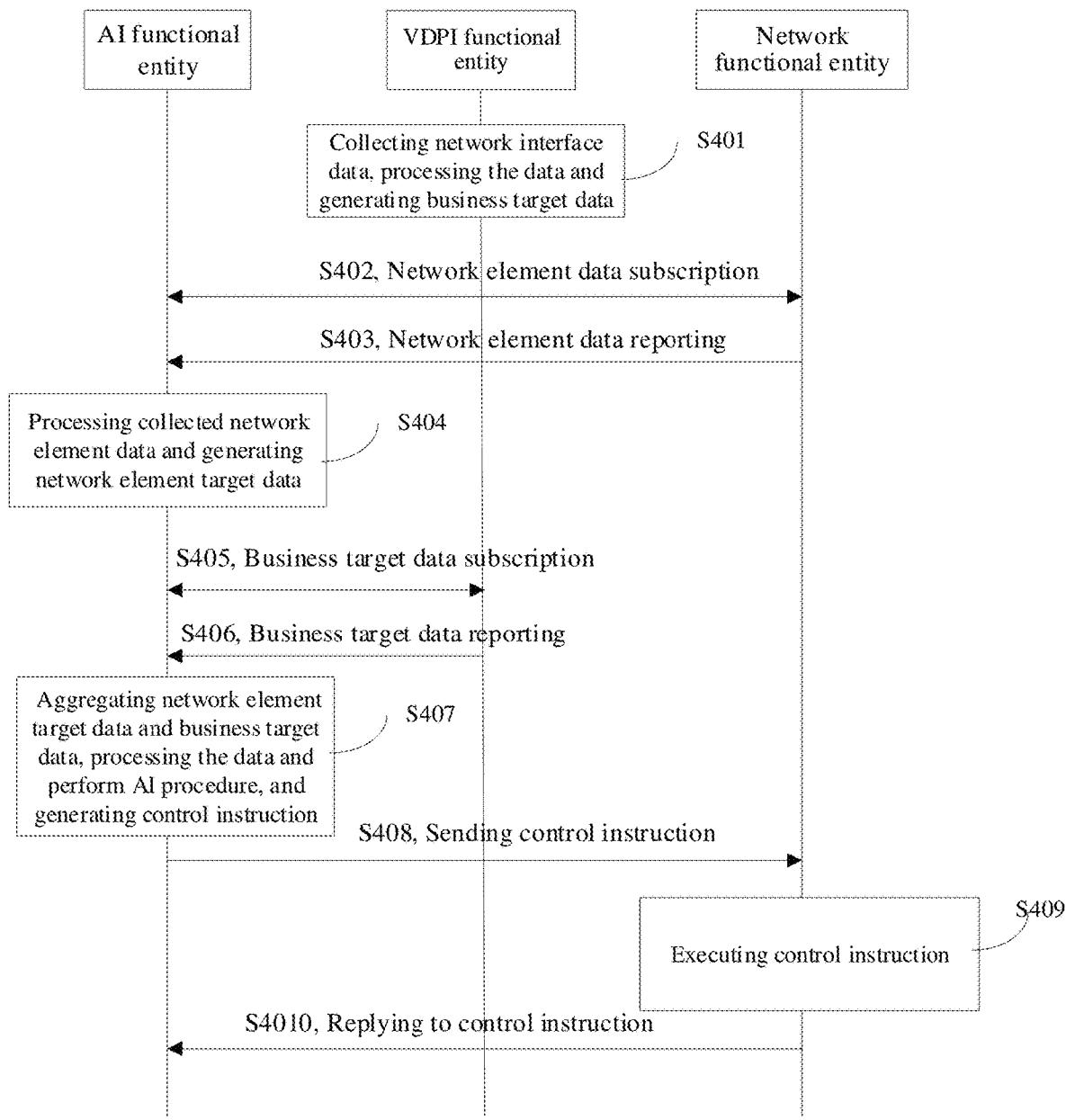
FIG. 6 is a schematic flowchart of a data processing method according to yet another embodiment of the present application.

As an optional embodiment, FIG. 6 is a schematic flowchart of a data processing method according to an embodiment of the present application. As shown in FIG. 6, an AI functional entity is a functional entity with AI capabilities, a VDPI functional entity is a functional entity with VDPI capabilities, and the network functional entity may include the DU, the RU, the CU_CP, the CU_UP and the like.

The specific steps of the method are as follows:

step S401: collecting, by the VDPI functional entity, the business related data over the network element interface through a virtual network element port mirroring manner, processing the business related data and generating business target data;

step S402: initiating, by the AI functional entity, a network element data subscription procedure with the network functional entity;

step S403: if the step S402 is successful, initiating, by the network functional entity, network element data reporting with the AI functional entity according to the subscription indication in step S402;

step S404: processing, by the AI functional entity, the network element data collected from the network functional entity, and generating network element target data;

step S405: initiating, by the AI functional entity, a business target data subscription procedure with the VDPI functional entity;

step S406: if step S405 is successful, initiating, by the VDPI functional entity, business target data reporting with the AI functional entity according to the subscription indication in step S405;

step S407: aggregating, by the AI functional entity, the network element target data and the business target data, and processing the business target data and AI procedures to generate the control instruction;

step S408: sending, by the AI functional entity, the control instruction generated in step S407 to the network functional entity;

step S409: executing, by the network functional entity, the control instruction received from the AI functional entity in step S408; and step S4010: replying, by the network functional entity, a control instruction reply message to the AI functional entity.

In the data processing method according to embodiments of the present application, the statistical tasks with respect to specific business-related target data that contributes to greater resource consumption are separated from regular service-oriented network functions/network element processes, and are handed over to an independent VDPI functional entity via the virtual port mirroring mode. Therefore, the service-oriented network functions or network elements can focus more on the business function itself. Not only the complexity of the network itself can be reduced and the stability of the system business function can be improved, but also a more comprehensive and more unified data source is provided for the network intelligence, which facilitates the openness of the data.

Figure 7:
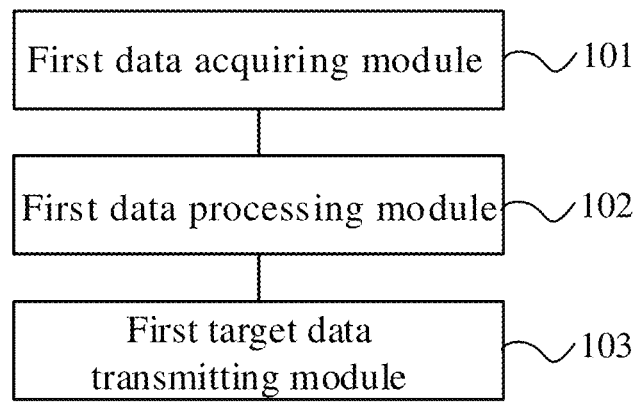
FIG. 7 is a schematic structural diagram of a data processing apparatus according to an embodiment of the present application.

FIG. 7 is a schematic structure diagram of a data processing apparatus according to an embodiment of the present application. As shown in FIG. 7, the apparatus includes:

a first data acquiring module 101 configured to acquire first data from a network element interface, the first data being business-related data;

a first data processing module 102 configured to acquire first target data by processing the first data; and a first target data transmitting module 103 configured to transmit the first target data to a second functional entity, for the second functional entity to generate a control instruction based on the first target data and second target data and to send the control instruction to the network element related to the control instruction;

wherein the second target data is obtained by the second functional entity by processing second data; the second data is acquired by the second functional entity from the network element; and the second data is data related to the network element.

As an optional embodiment, in the apparatus, the first data acquiring module is specifically configured to:
acquire, from the network element interface, the first data via a virtual deep packet inspection technique.

As an optional embodiment, in the apparatus, the first data processing module is specifically configured to:
process the first data to obtain first candidate data;
receive a first data subscription request transmitted from the second functional entity; and
obtain the first target data by filtering the first candidate data according to the first data subscription request.

As an optional embodiment, the apparatus further includes a data openness module configured to:
receive an openness requirement indication;
filtering the first candidate data based on the openness requirement indication, to obtain first open data; and
transmit the first open data to a data demander.

Figure 8:
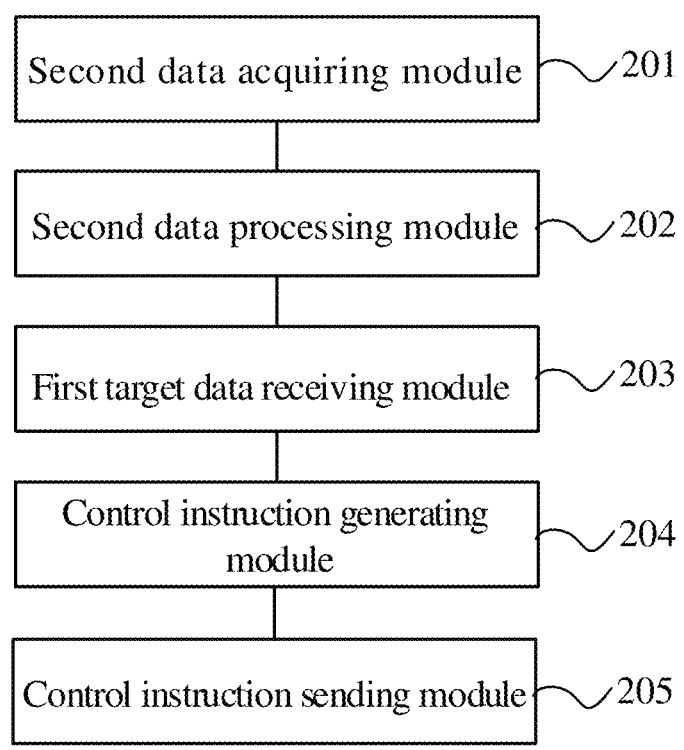
FIG. 8 is a schematic structural diagram of a data processing apparatus according to another embodiment of the present application.

FIG. 8 is a schematic structural diagram of a data processing apparatus according to another embodiment of the present application. As shown in FIG. 8, the apparatus includes:
a second data acquiring module 201 configured to acquire second data from a network element, the second data being data related to the network element;
a second data processing module 202 configured to acquire second target data by processing the second data;
a first target data receiving module 203 configured to receive first target data transmitted from a first functional entity;
wherein the first target data is obtained by the first functional entity by processing one the basis of first data, the first data is acquired by the first functional entity from a network element interface, and the first data is business-related data;
a control instruction generating module 204 configured to generate a control instruction based on the first target data and the second target data, and
a control instruction sending module 205 configured to send the control instruction to the network element related to the control instructions.

As an optional embodiment, in the apparatus, the second data acquiring module is specifically configured to:
receive a service requirement indication; determine, based on the service requirement indication, an associated network element related to the service requirement indication;
transmit a second data subscription request to the associated network element; and
receive the second data related to the second data subscription request that is transmitted from the associated network element.

As an optional embodiment, in the apparatus, the first target data receiving module is specifically configured to:
determine a first data subscription request according to the service requirement indication;
transmit the first data subscription request to the first functional entity, for the first functional entity to determine the first target data based on the first data subscription request; and
receive the first target data transmitted from the first functional entity.

As an optional embodiment, in the apparatus, the control instruction generating module is specifically configured to:
process the first target data and the second target data via a preset algorithm according to the service requirement indication, to obtain the control instructions.

The apparatus in embodiments of the present application may implement the methods according to embodiments of the present application and the implementation principles thereof are similar. The actions performed by the modules in embodiments of the present application correspond to the steps in the methods in the embodiments of the present application. The detailed description of the functions of the modules in the apparatus can refer to the description of the corresponding methods described above and will not be repeated here.

An embodiment of the present application provides an electronic device including a memory, a processor and a computer program stored on the memory, wherein the processor executes the above computer programs to implement the steps in the above data processing method. Compared with the prior art, the following technical effects can be achieved: the first data, i.e., business data, is acquired by the first functional entity from the network element interface, and the second data, i.e., network element data, is acquired by the second functional entity from the network element. Two different collection approaches (from the network element and from the network element interface) are implemented for data collection, and thus the business data and the network element data are collected separately. The business data is collected and processed by the first functional entity, and the processed first target data is transmitted from the first functional entity directly to the second functional entity. Compared with the prior art where all tasks of data collection and processing are concentrated in the network element, in the methods provided by embodiments of the present application, the collection and processing tasks of the business data are undertaken by the first functional entity, and the network element is freed from the collection and processing of the business data contributing a larger proportion of data. Therefore, the collection and processing of the business data will not affect the processing capability of the network element for the core businesses, and thus the network element can focus on processing the core businesses, further improving the stability and security of the core business function. Moreover, since the business data is collected by the first functional entity from the network element interface, the business data is collected without interaction with the network element, enabling data collection of the business data with no interference to the network. Further, compared with collecting data from the network element, when data is collected from the network element interface, there is no need to wait for data transmission to complete, and data collection can be done during the data transmission procedure, resulting in less latency and more efficient data collection.

Figure 9:
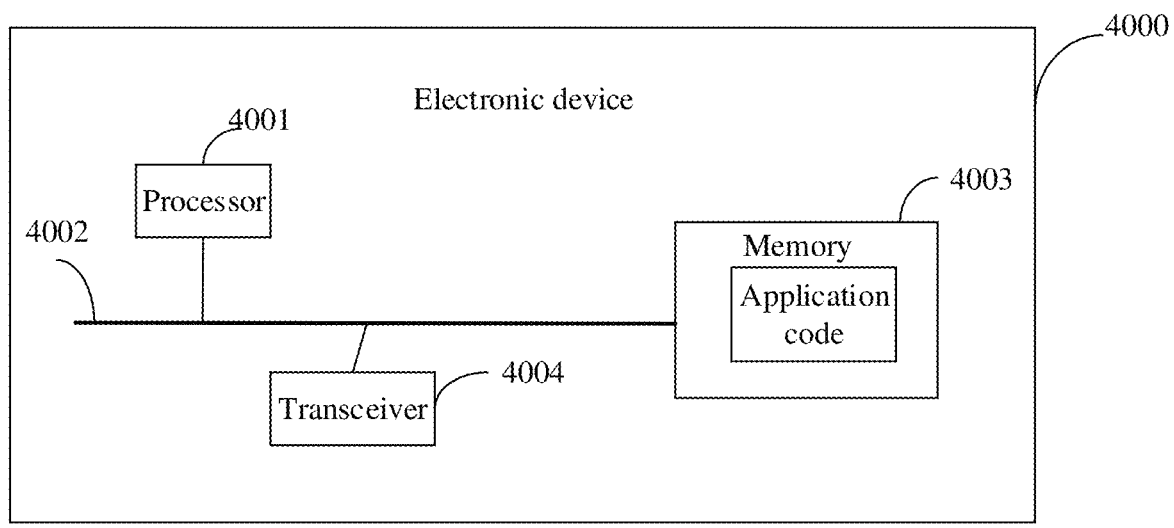
FIG. 9 is a schematic structural diagram of an electronic device according to an embodiment of the present application.

In an optional embodiment, there is provided an electronic device, as shown in FIG. 9. The electronic device 4000 as shown in FIG. 9 includes a processor 4001 and a memory 4003. The processor 4001 is connected with the memory 4003, for example, through the bus 4002. Optionally, the electronic device 4000 may further include a transceiver 4004 which may be used for data interaction between the electronic device and other electronic devices, such as data transmission and/or data reception and so on. It should be noted that, in practical applications, the number of transceivers 4004 is not limited to one, and the structure of the electronic device 4000 does not constitute a limitation to the embodiments of the present application.

The processor 4001 may be a central processing unit (CPU), a general-purpose processor, a digital signal processor (DSP), an application-specific integrated circuit (ASIC), a field programmable gate array (FPGA) or other programmable logic devices, transistor logic devices, hardware components, or any combination thereof. The processor can implement or execute various exemplary logic blocks, modules and circuits described in the disclosure of the present application. The processor 4001 may also be a combination for realizing computing functions, such as a combination including one or more microprocessors, a combination of a DSP and a microprocessor, and so on.

The bus 4002 may include a path to transfer information between the components described above. The bus 4002 may be a peripheral component interconnect (PCI) bus or an extended industry standard architecture (EISA) bus and so on. The bus 4002 may be divided into an address bus, a data bus, a control bus, and so on. For ease of presentation, only one thick line is used to denote the bus as shown in FIG. 9, but it does not mean that there is only one bus or one type of bus.

The memory 4003 may be a read only memory (ROM) or other types of static storage devices that may store static information and instructions, a random access memory (RAM) or other types of dynamic storage devices that may store information and instructions, it may also be an electrically erasable and programmable read only memory (EE-PROM), a compact disc read only memory (CD-ROM) or other optical disk storages, optical disk storages (including a compressed compact disc, a laser disc, a compact disc, a digital versatile disc, a blu-ray disc, etc.), a magnetic disk storage media, an other magnetic storage devices, or any other medium capable of carrying or storing computer programs and capable of being read by a computer, without limitation therein.

The memory 4003 is configured to store computer programs for executing the embodiments of the present application, and the execution is controlled by the processor 4001. The processor 4001 is configured to execute the computer programs stored in the memory 4003 to implement the steps shown in the foregoing method embodiments.

An embodiment of the present application provides a computer readable storage medium having computer programs stored thereon that, when executed by a processor, can implement the steps and corresponding contents in the above method embodiments.

The terms "first", "second", "third", "fourth", "1", "2", etc. (if any) in the specification and claims of the present application and the accompanying drawings are used for distinguishing similar objects, rather than describing a particular order or precedence. It is to be understood that the terms used is such a way are interchangeable in the appropriate cases, such that the embodiments of the present application described herein may be implemented in orders other than those illustrated or described in the text.

It should be understood that, although the operation steps are indicated by arrows in the flowcharts of the embodiments of the present application, the implementation order of these steps is not limited to the order indicated by the arrows. Unless otherwise explicitly stated herein, in some implementation scenarios of the embodiments of the present application, the implementation steps in the flowcharts may be executed in other orders as required. Further, part or all of the steps in each flowchart are based on actual implementation scenarios, and may include a plurality of sub-steps or a plurality of stages. Some or all of these sub-steps or stages may be executed at the same moment, and each of these sub-steps or stages may be separately executed at a different moment. In scenarios with different execution moments, the execution order of these sub-steps or stages may be flexibly configured according to requirements, which is not limited in embodiments of the present application.

The above are only optional implementations of some implementation scenarios of the present application. It should be pointed out that, for a person of ordinary skilled in the art, the other similar implementation means based on the technical idea of the present application shall also fall into the protection scope of the embodiments of the present application without departing from the technical idea of the solutions of the present application.

What is claimed is:

1. A data processing method applied with a first functional entity, comprising:
    acquiring first data from a network element interface, the first data being business-related data;
    processing the first data to obtain first candidate data;
    receiving a first data subscription request transmitted from the second functional entity;
    obtaining the first target data by filtering the first candidate data according to the first data subscription request;
    receiving an openness requirement indication;
    filtering the first candidate data based on the openness requirement indication to obtain first open data;
    transmitting the first open data to a data demander;
    transmitting the first target data to a second functional entity, for the second functional entity to generate a control instruction based on the first target data and second target data and to send the control instruction to a network element related to the control instruction; and
    wherein the second target data is obtained by the second functional entity by processing second data, the second data is acquired by the second functional entity from the network element, and the second data is data related to the network element.

2. The data processing method according to claim 1, wherein the acquiring first data from a network element interface comprises:
    acquiring, from the network element interface, the first data via a virtual deep packet inspection technique.

3. A data processing method applied with a second functional entity, comprising:
    acquiring second data from a network element, the second data being data related to the network element;
    acquiring second target data by processing the second data; and
    receiving first target data transmitted from a first functional entity;
    wherein the first target data is obtained by the first functional entity by performing the following operations: - processing the first data to obtain first candidate data; receiving a first data subscription request transmitted from the second functional entity; obtaining the first target data by filtering the first candidate data according to the first data subscription request; the first data is business-related data, and the first candidate data is used for filtering based on an openness requirement indication to obtain first open data so as to transmit the first open data to a data demander;

generating a control instruction based on the first target data and the second target data; and sending the control instruction to the network element related to the control instruction.

4. The data processing method according to claim 3, wherein the acquiring second data from a network element comprises:

receiving a service requirement indication;

determining, based on the service requirement indication, an associated network element related to the service requirement indication;

transmitting a second data subscription request to the associated network element; and receiving the second data related to the second data subscription request that is transmitted from the associated network element.

5. The data processing method according to claim 4, wherein the receiving first target data transmitted from a first functional entity comprises:

determining a first data subscription request according to the service requirement indication;

transmitting the first data subscription request to the first functional entity, for the first functional entity to determine the first target data based on the first data subscription request; and receiving the first target data transmitted from the first functional entity.

6. The data processing method according to claim 4, wherein the generating a control instruction based on the first target data and the second target data comprises: processing the first target data and the second target data via a preset algorithm according to the service requirement indication, to obtain the control instruction.

7. A data processing method, comprising:

acquiring, by a first functional entity, first data from a network element interface, and processing the first data to obtain first candidate data, receiving a first data subscription request transmitted from a second functional entity; obtaining the first target data by filtering the first candidate data according to the first data subscription request, wherein the first data is business-related data;

receiving, by the first functional entity, an openness requirement indication;

filtering, by the first functional entity, the first candidate data based on the openness requirement indication to obtain first open data;

transmitting, by the first functional entity, the first open data to a data demander;

acquiring, by a the second functional entity, second data from a network element, and acquiring second target data by processing the second data, wherein the second data is data related to the network element;

transmitting, by the first functional entity, the first target data to the second functional entity;

receiving, by the second functional entity, the first target data;

generating, by the second functional entity, a control instruction, based on the first target data and the second target data; and sending, by the second functional entity, the control instruction to the network element related to the control instruction.

8. An electronic device, comprising a memory, a processor and a computer program stored on the memory, wherein the processor is configured to execute the computer program to implement steps of the method according to claim 1.

9. An electronic device, comprising a memory, a processor and a computer program stored on the memory, wherein the processor is configured to execute the computer program to implement steps of the method according to claim 2.

10. An electronic device, comprising a memory, a processor and a computer program stored on the memory, wherein the processor is configured to execute the computer program to implement steps of the method according to claim 3.

11. An electronic device, comprising a memory, a processor and a computer program stored on the memory, wherein the processor is configured to execute the computer program to implement the steps of the method according to claim 7.

12. A non-transitory computer readable storage medium having a computer program stored thereon, wherein the computer program, when executed by a processor, implements steps of the method according to claim 1.

13. A non-transitory computer readable storage medium having a computer program stored thereon, wherein the computer program, when executed by a processor, implements steps of the method according to claim 2.

14. A non-transitory computer readable storage medium having a computer program stored thereon, wherein the computer program, when executed by a processor, implements steps of the method according to claim 3.

15. A non-transitory computer readable storage medium having a computer program stored thereon, wherein the computer program, when executed by a processor, implements steps of the method according to claim 7.

* * * * *